Aug. 23, 1949.　　　P. G. E. HAND ET AL　　　2,479,927
ARRESTER GEAR FOR AIRCRAFT
Filed Feb. 18, 1948　　　3 Sheets-Sheet 1

INVENTORS
PERCY GEORGE EYNON HAND
LAWRENCE PROCTOR
BY Otto Munk
THEIR ATTY

Aug. 23, 1949.   P. G. E. HAND ET AL   2,479,927
ARRESTER GEAR FOR AIRCRAFT
Filed Feb. 18, 1948   3 Sheets-Sheet 2
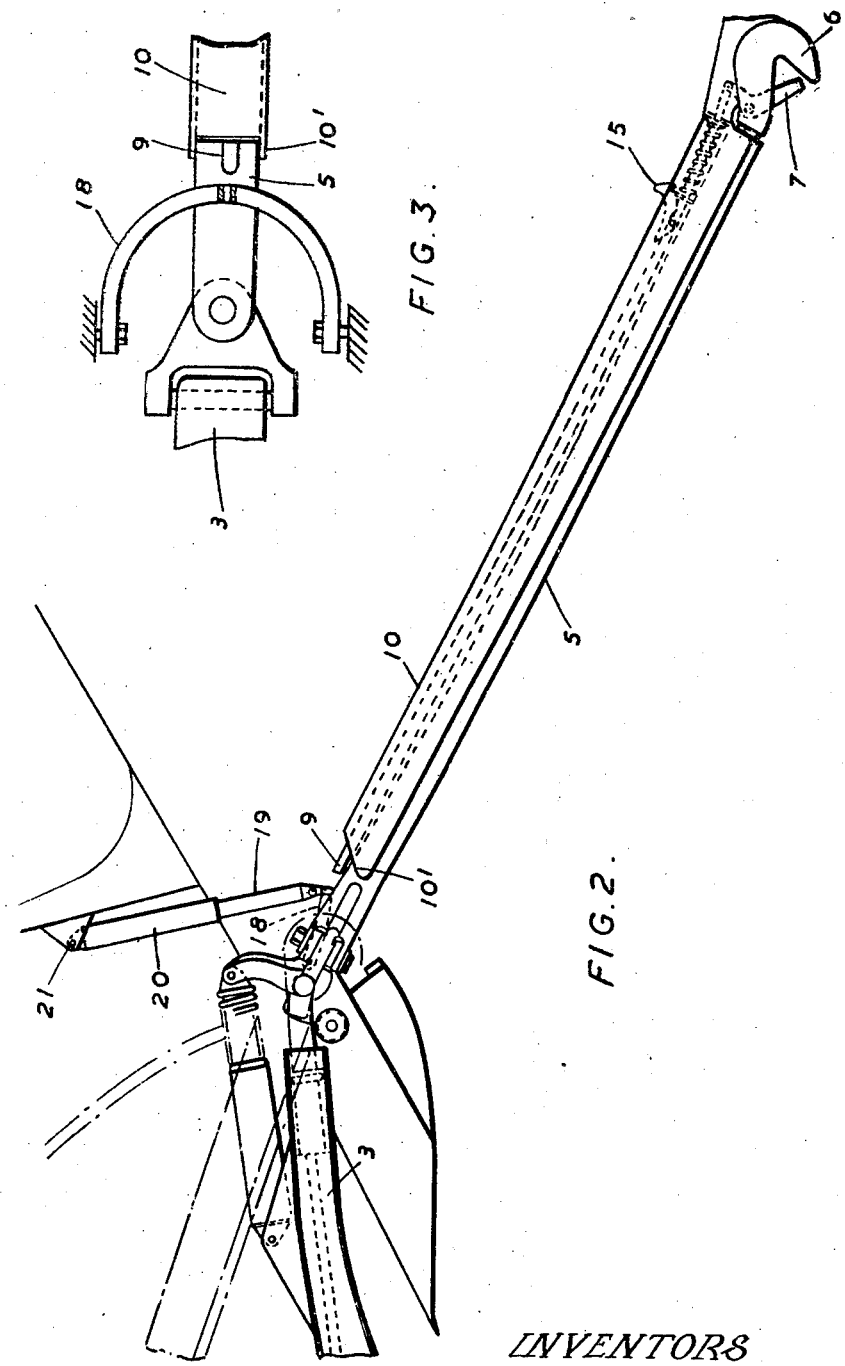
INVENTORS
PERCY GEORGE LYNON HAND
LAWRENCE PROCTOR
BY Otto Munk
THEIR ATTY Aug. 23, 1949.　　P. G. E. HAND ET AL　　2,479,927
ARRESTER GEAR FOR AIRCRAFT
Filed Feb. 18, 1948　　3 Sheets-Sheet 3

INVENTORS
PERCY GEORGE LYNON HAND
LAWRENCE PROCTOR
BY Otto Munk
THEIR ATTY

Patented Aug. 23, 1949

2,479,927

UNITED STATES PATENT OFFICE 2,479,927

ARRESTER GEAR FOR AIRCRAFT

Percy George Eynon Hand, North Ferriby, and Lawrence Proctor, Brough, England, assignors to Blackburn and General Aircraft Limited, a British company Application February 18, 1948, Serial No. 9,215
In Great Britain September 27, 1947

4 Claims. (Cl. 244—110)

1

This invention relates to arrester gear for aircraft comprising a hook on the end of a free swinging arm carried by the aircraft rearwardly of the main landing wheels, which hook is intended to catch an arresting cable raised a short distance above the landing ground such as the deck of an aircraft carrier. After the hook has caught the arrester wire and the aircraft brought to rest, it is necessary to disengage the cable from the hook which is usually done manually although it has been proposed to provide means for ejecting the arrester cable from the mouth of the hook by means carried on the hook and operable internally of the aircraft to disengage the cable at will.

The present invention is particularly concerned with power retracted arrester gear, for example of the nature of the arrester gear assembly described in the specification of co-pending patent application Serial No. 9,083 (based on British patent application No. 503 of 1947) in which the hook arm is retracted within the fuselage by pivoting the same to an internally carried swinging arm, and it has for its principal object to provide an automatically acting cable ejecting device which will function as a result of the retraction of the hook arm.

Another object of the invention is to so construct the cable ejecting means that after operation to eject an arresting cable the mouth of the hook will be closed to prevent it picking up the same or another arresting cable.

A further object of the invention is to provide such an automatically acting cable ejecting device in which the hook is normally open to receive an arresting cable, the ejecting means operate on initial retractive movement of the hook and close the hook, and the final retractive movement opens the hook and conditions the ejecting means ready for future use.

The above and further objects of the invention will be apparent from the following description of an embodiment of hook arm of an aircraft arrester gear provided with the cable ejecting means.

In the accompanying drawings—

Figure 1:
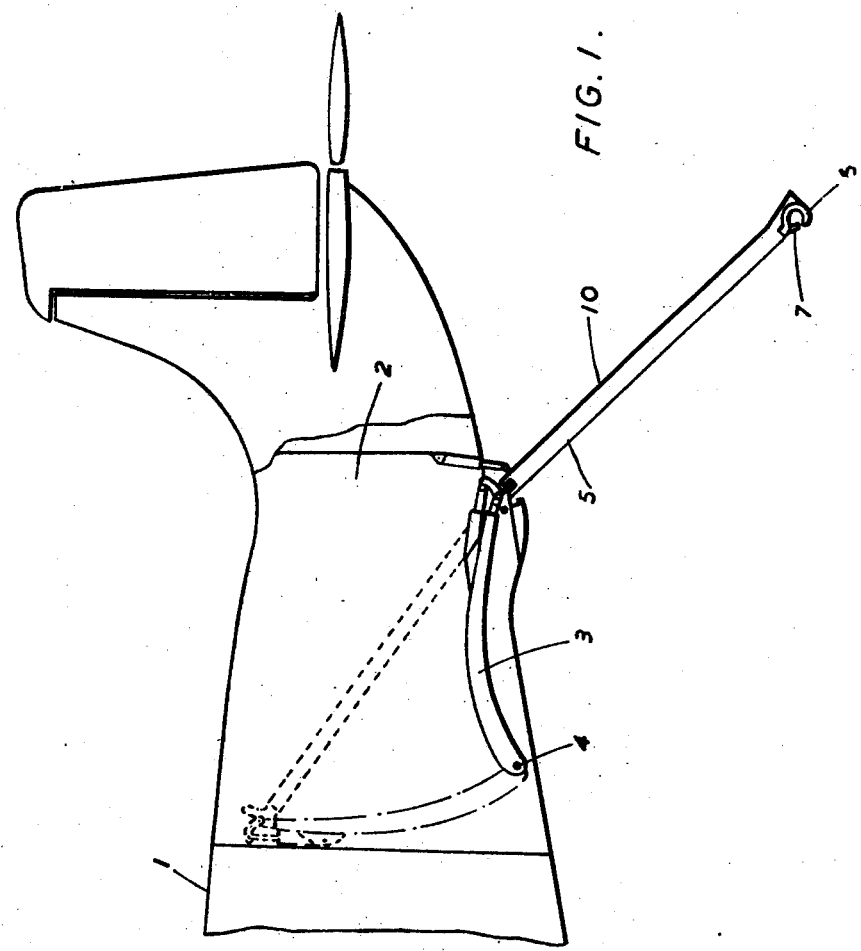
Figure 4:
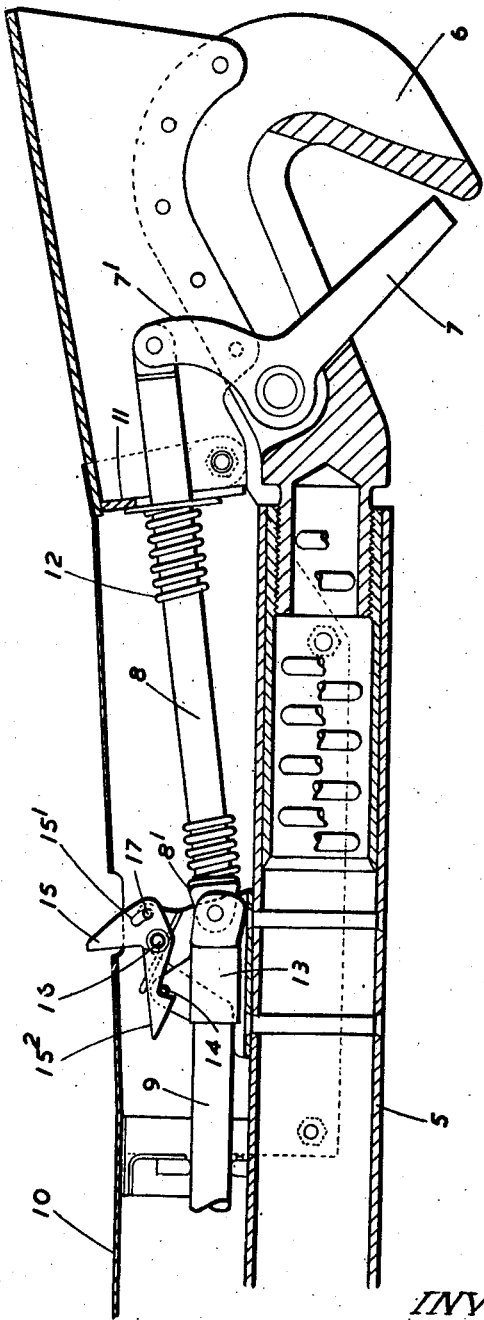

Figure 1 is a side elevation of the rear end of an aircraft with part of the fuselage broken away to show the hook-arm retraction means and the position the parts occupy when retracted, Figure 2 is a side elevation showing on a larger scale the hook-arm and arrester cable ejecting means, Figure 3 is a detail plan view on a still larger scale showing the actuating means for operating the ejector push rod, and Figure 4 is a sectional elevation on a still larger scale showing the ejector and latching means.

Referring now to the said drawings and in particular to Figure 1 thereof, an aircraft fuselage 1 is provided with an internal compartment 2 in which is provided a power operated retraction lever 3 pivoting about an axis 4. Pivoted to the end of the retraction lever 3 for free swinging movement about axes at right angles is a hook-arm 5 which terminates in a hook 6. The retraction lever 3 swings from the position shown in full line with the hook-arm 5 extended in operative position into a retracted position shown in broken lines in Figure 1 when the hook-arm 5 is retracted within the fuselage 1 of the aircraft. This construction of hook-arm and retraction means desirably incorporates means for damping the movement of the hook-arm 5 about its horizontal axis of movement and means for damping its movements about its "vertical" axis.

The cable ejecting element (see Figures 2 and 4) comprises a lever 7 pivoted at or near the neck of the hook 6 between a position in which it lies across the mouth of the hook (as shown in the drawings) to a retracted position lying along the hook fully to expose its mouth. The lever 7 is fashioned as a bellcrank and its other and shorter limb $7^1$ is connected through a link 8 to a push rod 9 extending along and axially displaceable relative to the hook-arm 5 conveniently within a shrowd 10. The link 8 extends through a transverse partition 11 and a coil compression spring 12 is disposed between the partition 11 and the enlarged end $8^1$ of the link where the same is connected to the push rod 9. The adjacent end of the push rod 9 carries a member 13 provided with a laterally extending pin 14. A spring loaded latch member 15 is arranged to pivot on a transverse axis 16 and has a limited degree of movement provided by a slot $15^1$ co-operating with a pin 17. The latch member 15 is formed as a bellcrank lever of which the limb $15^2$ is formed as a hook to engage the pin 14 of the member 13 on the end of the push rod 9. The other limb of the latch member 15 projects through an aperture in the shrowd 10 normally to stand proud thereof substantially as shown and so form an exposed trigger or actuating part.

The other end of the push rod 9 at a point near the pivot point of the hook-arm 5 is situated in the path of an abutment conveniently in the form of an arcuate or semi-circular plate 18 (see Figure 3) so that the end of the push rod 9 will engage the same in any angular position of the hook-arm 5 about its "vertical" axis. The abutment plate 18 is pivoted at its ends to a structural part of the fuselage and centrally is connected to the displaceable part 19 of a spring loaded device 20 which is pivoted at 21 conveniently to a wall of the compartment into which the hook-arm is retracted. The effect of the spring loaded device 20 is to urge the abutment plate 18 always towards the hook-arm 5 yet not impede the free angular movement of that arm about its horizontal axis of movement. The end of the shrowd 10 beyond which this end of the push rod projects is inclined as at 10¹ such that after the abutment plate 18 has effected an axial displacement of the push rod 9 as a consequence of axial movement of the hook-arm 5, it will ride up the sloping end wall 10¹ onto the shrowd 10 due to its pivotal mounting and so allow further unimpeded retracted movement of the hook-arm 5.

The operation of the mechanism is as follows:

With the hook-arm 5 extended and the mouth of the hook unobstructed an arrester cable raised a short distance above the landing deck will catch in the hook and stop the forward movement of the aircraft. After the aircraft has been brought to rest, the pilot initiates the power retraction of the arrester gear which causes an upward swinging movement of the retraction lever 3 about its pivot 4 with consequent axial movement of the hook-arm 5. On the initial movement of the latter the end of the push rod 9 engages the abutment plate 18 with consequent axial displacement of the push rod and of the link 8 connected thereto to rock the ejecting lever 7 from its retracted position so as to push the arresting cable out of the mouth of the hook 6. The displacement of the push rod 9 causes the pin 14 to rock the latching member 15 and thereafter become latched against return movement by its engagement with the limb 15² and this displacement also tensions the compression spring 12. The effect of this latching of the parts is to hold the ejection lever 7 across the mouth of the hook (i. e. as illustrated in Figure 4) thereby effectively preventing the hook 6 engaging or catching into the same or another arrester cable as the retraction of the hook-arm proceeds. At the final retractive movement, the abutment plate 18 engages the projecting portion of the latch member 15 and trips the same so that its limb 15² disengages from the pin 14 whereupon the spring 18 becomes effective to thrust the push rod 9 in reverse direction to its previous displacement and at the same time pull back the ejector lever 7 into its normal retracted position clear of the mouth of the hook ready for further operation on again extending the hook-arm 5 into its operative position.

We claim:

1. An arrester gear for aircraft including an arm retractable by lengthwise movement, a hook on the end of said arm, a bellcrank lever pivoted on said hook, spring means loading said bellcrank lever, latching means associated with said spring means, a push rod connected to said bellcrank lever and extending axially of said arm, and an abutment in path of said push rod and capable of releasing said latching means.

2. An arrester gear for aircraft including a free swinging arm retractable by lengthwise movement, a hook on the end of said arm, an element pivoted to said hook for rocking movement to eject a cable which has entered the mouth of said hook, spring means effective on said element to tend to restore it to its normal position, a push rod mounted on said arm for axial movement, means connecting said push rod to said element, latching means effective on displacement of said element to lock said element against return, an abutment in path of said push rod to be engaged thereby on retractive movement of said arm to rock said element to eject a cable, and means connected to said latching means and engageable by said abutment to disengage said latching means towards the end of retractive movement of said arm.

3. An arrester gear for aircraft including a free swinging arm, means within the aircraft fuselage for retracting said arm by lengthwise movement, a hook on the end of said arm, an element pivoted to said hook for rocking movement to eject a cable which has entered the mouth of said hook, a push rod mounted for axial movement on said arm, means connecting said push rod to said element, a pivoted abutment in path of said push rod to be engaged thereby on initial retraction of said arm to rock said element, spring means biasing said pivoted abutment towards said arm, spring means biasing said element towards its normal position, latching means effective on displacement of said element for rendering said last mentioned spring means inoperative, and means for releasing said latching means on engaging said abutment towards the end of the retractive movement of said arm.

4. An arrester gear for aircraft including a retraction lever within the aircraft fuselage, an arm freely pivoted to said lever to extend through said fuselage for retraction by lengthwise movement, a hook on the free end of said arm, a lever element pivoted to said hook for rocking movement out of its normal position to eject a cable which has entered the mouth of said hook, a push rod mounted for axial movement on said arm, means connecting said push rod to said lever element, a pivoted arcuate member located in the path of said push rod, spring means biasing said arcuate member towards said arm to be engaged by said push rod on initial retractive movement of said arm, shrowd means covering said push rod camming means for displacing said arcuate means onto said shrowd means after displacing said push rod, spring loading means biasing said lever element towards its normal position, latching means for rendering said spring loading means inoperative after a displacement of said lever element, and means extending through said shrowd means to be engaged by said arcuate member towards the end of retractive movement of said arm to release said latching means.

PERCY GEORGE EYNON HAND.
LAWRENCE PROCTOR.

REFERENCES CITED

The following references are of record in the file of this patent:

UNITED STATES PATENTS

| Number | Name | Date |
| --- | --- | --- |
| 2,034,083 | Butler | Mar. 17, 1936 |
| 2,404,381 | Jolly | July 23, 1946 |